Patented Feb. 19, 1929.

1,702,381

UNITED STATES PATENT OFFICE.

JEAN DURÁN, OF DIJON, FRANCE, ASSIGNOR TO UNITED SHOE MACHINERY CORPORATION, OF PATERSON, NEW JERSEY, A CORPORATION OF NEW JERSEY.

PATTERN-GRADING MACHINE.

Application filed March 22, 1927, Serial No. 177,453, and in France April 2, 1926.

This invention refers to pattern grading, and is disclosed as embodied in a pattern grading machine of the type shown in United States Letters Patent No. 1,105,534, granted July 28, 1914, on the application of A. F. Preston. Machines of this type comprise a holder wherein the workpiece and a pattern are held one over the other in parallel planes, and a pattern tracer and a cutting device, the holder and cutting device being movable universally relatively to one another in a plane to enable the contour of the pattern under contact with the tracer to be reproduced on a workpiece in the holder, the tracer and cutting device being interconnected by pantograph mechanism. The invention is, however, not to be regarded as limited in its application to machines of the particular kind just referred to.

In machines of the kind referred to the pattern and workpiece are usually clamped between coaxial clamping discs. The present day tendencies of shoe design are such that many patterns requiring to be reproduced have not at any part of them a plain or blank area sufficient in extent to receive such a clamp. This renders it impracticable to reproduce such a pattern in a machine of the kind referred to without providing a supplementary marginal blank area on the pattern purely for clamping purposes. Such a course is not only wasteful of the materials from which the pattern and the reproductions are made but involves a final trimming by hand to cut away from the reproduction the part corresponding to the supplementary clamping area of the pattern and to perfect the reproduction at that location, a procedure which involves expense and inaccuracy.

Again, it is frequently the case that the pattern comprises one or more "cut-outs" (i. e. closed-sided openings such as more or less oblong or other slots) within which the pattern tracer must be introduced and from which it must be withdrawn in the course of the grading and cutting operation. This involves springing the pattern onto or off the tracer which injures the pattern in course of time and is liable to distort it and affect the accuracy of subsequent reproductions, especially when such cut-outs are close to the clamping area.

The principal object of this invention is to overcome the above difficulties and to provide for a saving of time in pattern reproduction, a saving of pattern and workpiece materials and to secure preservation of the patterns in good condition and to insure accurate work where conditions such as those referred to above are met with.

In accordance with features of the invention provision is made whereby clamping of patterns having only comparatively small blank areas may be effected without the necessity of providing the same with supplementary and purely clamping areas and whereby the introduction of the tracer device into and its withdrawal from "cut-outs" in the clamped pattern may be effected without springing the pattern.

A construction illustrating one of many different ways in which the invention may be embodied and the preferred way of using that construction will now be described with reference to the accompanying drawings.

In these drawings.

Figure 1:
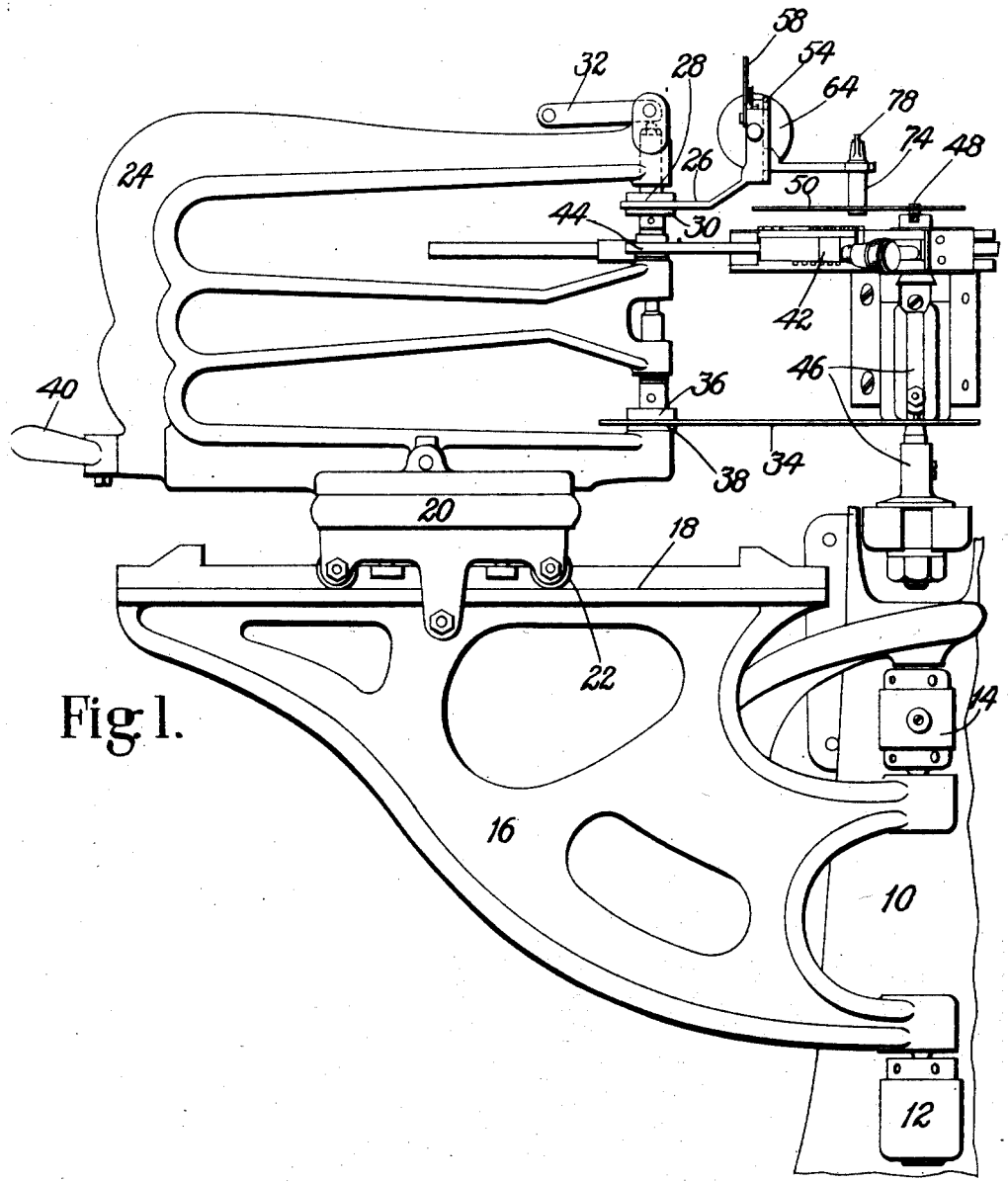
Fig. 1 is a side elevation of the essential parts of the machine.
Figure 2:
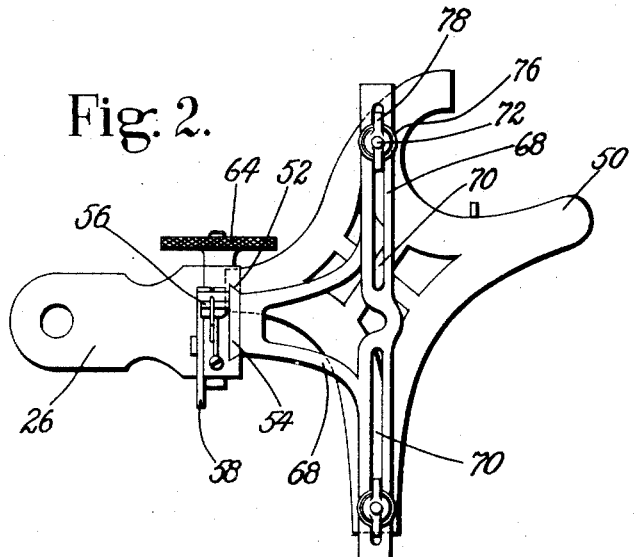
Fig. 2 is a plan view of one device according to the invention with a pattern clamped therein.

The machine comprises a main frame 10, on which is pivotally mounted at 12—14, an arm 16. On the upper face of the arm is a track 18 on which a carriage 20 is mounted on rollers 22. The swinging arm 16 corresponds to the table 1 in the patent referred to. The carriage 20, which corresponds to the base 6 of the patent, carries a trifurcate frame 24 corresponding to the jack 5 of the patent. The pattern holder 26 is clamped between members 28, 30 on the upper two arms of the frame 24, by a handle 32; and the workpiece 34 is clamped between members 36, 38 on the lower two arms of the frame 24 by a handle 40. The elements 28, 30, 32 correspond to the elements 17, 16, 20 of the patent.

The pantograph mechanism 42, which is similar to that shown in the patent, is pivoted to the frame 24 between the upper two arms, at 44, and connects the frame 24 with the cutter mechanism 46, which is mounted on the frame 10, and with the tracer member 48 which is slidably mounted in guides in the frame 10, and is moved relatively to the cutting device by the pantograph mechanism, all substantially as in the patent referred to.

The pattern 50 is held by the pattern holder 26 instead of between the members 28, 30 as in the patent. The holder 26 has an upright guide 52 with a vertical dovetailed slot in which slides a dovetail rib 54 having a pin 56 which co-operates with a lever 58 pivoted on the holder 26 at 60. A spring 62 on the holder 26 normally forces the pin 56 down to rest on the upper surface of the guide 52. The lever 58 can be used to raise the rib 54 to any desired position, where it can be clamped by the screw and nut at 64 by means of a slot 66 in the guide 52.

The rib 54 has a horizontal extension 68 having slots 70 and movable to different positions in these slots are a pair of clamping devices each comprising a bolt 72, collar 74, washer 76 and wing nut 78.

At any two convenient points within its area the pattern 50 is provided with holes and through these the bolts 72 set at the right distance apart in the slots 70 are respectively threaded so that on tightening the wing nuts the pattern is secured firmly (between the bolt heads and collars) to the member 68 to lie in a horizontal plane and be spaced some little distance beneath and away from the member 68, by the thickness of the collars 74.

Figure 3:
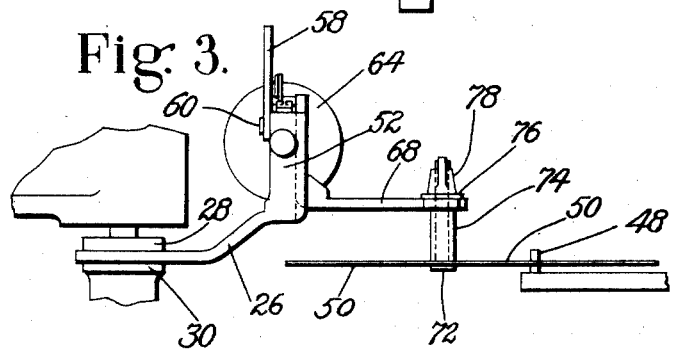
Fig. 3 is a side elevation of the parts shown in Fig. 1 illustrating also their association with the usual pattern clamp and pattern tracing device of a machine of the type described in the specification aforementioned.
Figure 4:
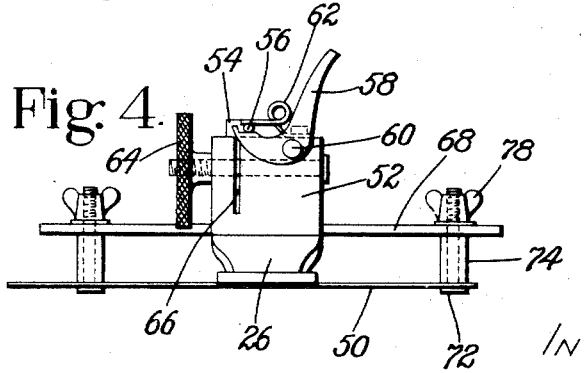
Fig. 4 is a rear elevation of the device.

As seen in Fig. 3, the outlines of the pattern can now be completely traced by the tracer 48 reproduced upon that portion of the work 34, clamped in the workpiece clamps 36, 38, that lies beneath the pattern, so that a finished reproduction can be obtained directly from the machine although no part of the pattern provides a blank area of more than small width. The mode of clamping is such that any pattern can be clamped and reproduced that provides, as all ordinary patterns inevitably will do, two locations (separated by a distance no greater than the combined lengths of the slots 70) at each of which its material is wider than the diameter of the heads of bolts and of the collars 74 requisite to secure effective clamping.

When it is desired to commence reproducing a "cut-out" or to pass the guide from one "cut-out" to another the nut 64 is slackened off, the pattern lifted bodily above the level of the tracer 48 of the machine by pressure on the lever 58 and the pattern then moved (by movement of the frame 24) until the desired "cut-out" comes above the tracer 48. The lever 58 is then released, the pattern 50 descends over the tracer 48 and the nut 64 is once more tightened. Any springing of the pattern in moving the tracer 48 into or out of a "cut-out" is rendered quite unnecessary by this simple and speedy procedure.

Except as just described, the machine is constructed and operates as disclosed in the patent referred to.

Having described my invention, what I claim as new and desire to secure by Letters Patent of the United States is:

1. In a pattern grading machine, a tracer pin and a tool, a pattern holder and a work holder arranged for plane universal movement relatively to the tracer and tool respectively, the pattern holder comprising a member arranged to support a pattern in a plane perpendicular to the tracer pin and at a substantial distance from the plane of the pattern holder.

2. In a pattern grading machine, a pattern tracer and a pattern holder arranged to hold a pattern, the holder and tracer being arranged to permit plane universal relative movement of the pattern and tracer and to permit relative movement of the tracer around the pattern, the holder being substantially spaced from the plane of the pattern to avoid interference between the holder and the tracer.

3. In a pattern grading machine, a pattern holder and a pattern tracer, and means for displacing the pattern transversely to its plane to permit the tracer to be introduced into or removed from a closed-sided opening in the pattern.

4. In a pattern grading machine, a tracer, and a pattern holder comprising a pattern holding slide arranged for movement perpendicular to the plane of a pattern on the holder to enable the pattern to pass relatively over the tracer without interference therewith, in order to relate operatively the tracer and a cut-out in the pattern.

5. In a pattern grading machine, a tracer, a pattern holder comprising a pattern holding slide arranged for movement perpendicular to the plane of a pattern on the holder to enable the pattern to pass relatively over the tracer without interference therewith, and means for moving the slide.

6. In a pattern grading machine, a pair of members arranged to clamp a thin flat object between them, a model follower arranged to move relatively to the members in the plane of an object clamped therein, and a model holding member arranged to be clamped between the members, said model holding member having an offset portion displaced out of the said plane and arranged to carry a model in said plane.

In testimony whereof I have signed my name to this specification.

JEAN DURÁN.